(12) United States Patent
Fang et al.

(10) Patent No.: US 9,594,603 B2
(45) Date of Patent: Mar. 14, 2017

(54) APPLICATION-TO-APPLICATION LAUNCH WINDOWING

(71) Applicant: Microsoft Corporation, Redmond, WA (US)

(72) Inventors: Richie Fang, Bellevue, WA (US); Jesse Clay Satterfield, Seattle, WA (US); Matthew Isaac Worley, Bellevue, WA (US); Chaitanya Sareen, Seattle, WA (US); Jake Sabulsky, Kirkland, WA (US); Charing Wong (Tsz Yan Wong), Seattle, WA (US); Alice Steinglass, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/862,478

(22) Filed: Apr. 15, 2013

(65) Prior Publication Data
US 2014/0310728 A1   Oct. 16, 2014

(51) Int. Cl.
*G06F 9/54*   (2006.01)
*G06F 9/44*   (2006.01)

(52) U.S. Cl.
CPC .............. *G06F 9/54* (2013.01); *G06F 9/4443* (2013.01)

(58) Field of Classification Search
CPC .................................. G06F 9/54; G06F 9/4443
See application file for complete search history.

(56) References Cited

U.S. PATENT DOCUMENTS

| | | |
|---|---|---|
| 5,712,995 A | 1/1998 | Cohn |
| 5,880,725 A | 3/1999 | Southgate |
| 5,889,517 A | 3/1999 | Ueda et al. |
| 5,920,315 A | 7/1999 | Santos-Gomez |
| 6,008,809 A | 12/1999 | Brooks |
| 7,028,266 B2 | 4/2006 | Ben-Shachar et al. |

(Continued)

FOREIGN PATENT DOCUMENTS

| | | |
|---|---|---|
| EP | 2060970 A1 | 5/2009 |
| EP | 2535809 A1 | 12/2012 |

(Continued)

OTHER PUBLICATIONS

International Searching Authority, U.S. Patent and Trademark Office, International Search Report for PCT/US2013/059332, dated Sep. 12, 2013, 5 pages.

(Continued)

*Primary Examiner* — Syed Roni
(74) *Attorney, Agent, or Firm* — Bryan Webster; Dan Choi; Micky Minhas

(57) ABSTRACT

A window management system manages the placement of a window of a target application within a user interface. A source application launches the target application. The window management system arbitrates placement of a window of a target application within the user interface based on a target application placement preference parameter and a source application placement preference parameter. The window management system displays the window of the target application within the user interface according to the arbitrated placement. The window management system can also display a window of the source application within the user interface according to the arbitrated placement.

20 Claims, 8 Drawing Sheets

(56) References Cited

U.S. PATENT DOCUMENTS

| | | | |
|---|---|---|---|
| 7,159,189 | B2 | 1/2007 | Weingart et al. |
| 7,596,761 | B2 | 9/2009 | Lemay et al. |
| 7,783,989 | B2 | 8/2010 | Kim et al. |
| 7,890,882 | B1 | 2/2011 | Nelson |
| 7,900,139 | B2 | 3/2011 | Hosotsubo |
| 7,904,832 | B2 | 3/2011 | Ubillos |
| 8,276,095 | B2 | 9/2012 | Cutler et al. |
| 8,633,913 | B1 | 1/2014 | Raghu et al. |
| 2002/0191028 | A1 | 12/2002 | Senechalle et al. |
| 2004/0207663 | A1 | 10/2004 | Asakura |
| 2005/0022135 | A1 | 1/2005 | de Waal |
| 2005/0088447 | A1 | 4/2005 | Hanggie et al. |
| 2005/0134578 | A1 | 6/2005 | Chambers et al. |
| 2005/0188329 | A1 | 8/2005 | Cutler et al. |
| 2006/0020903 | A1 | 1/2006 | Wang et al. |
| 2006/0053384 | A1 | 3/2006 | La Fetra et al. |
| 2006/0085748 | A1 | 4/2006 | Luther et al. |
| 2006/0236264 | A1 | 10/2006 | Cain et al. |
| 2006/0271864 | A1 | 11/2006 | Satterfield et al. |
| 2007/0180400 | A1 | 8/2007 | Zotov et al. |
| 2007/0180401 | A1* | 8/2007 | Singh et al. .................. 715/794 |
| 2007/0229526 | A1 | 10/2007 | Hsu |
| 2008/0005694 | A1* | 1/2008 | Abdo .................... G06F 9/4443 715/794 |
| 2008/0126989 | A1 | 5/2008 | Flores et al. |
| 2009/0013282 | A1 | 1/2009 | Mercer |
| 2009/0122018 | A1 | 5/2009 | Vymenets et al. |
| 2010/0088634 | A1 | 4/2010 | Tsurata et al. |
| 2010/0248788 | A1 | 9/2010 | Yook et al. |
| 2011/0087982 | A1 | 4/2011 | McCann et al. |
| 2011/0119597 | A1 | 5/2011 | Yellamraju et al. |
| 2011/0161868 | A1* | 6/2011 | Green et al. .................. 715/789 |
| 2012/0054674 | A1 | 3/2012 | Beykpour et al. |
| 2012/0159382 | A1 | 6/2012 | Matthews et al. |
| 2012/0166980 | A1 | 6/2012 | Yosef et al. |
| 2012/0179994 | A1* | 7/2012 | Knowlton et al. ............ 715/779 |
| 2012/0242703 | A1 | 9/2012 | Sirpal et al. |
| 2012/0287039 | A1 | 11/2012 | Brown et al. |
| 2012/0299968 | A1 | 11/2012 | Wong et al. |
| 2013/0024805 | A1 | 1/2013 | In et al. |
| 2013/0254708 | A1 | 9/2013 | Dorcey |
| 2013/0346922 | A1 | 12/2013 | Shiplacoff et al. |
| 2014/0053097 | A1 | 2/2014 | Shin et al. |
| 2014/0096050 | A1 | 4/2014 | Boblett et al. |
| 2014/0310642 | A1 | 10/2014 | Vranjes et al. |
| 2014/0310646 | A1 | 10/2014 | Vranjes et al. |
| 2014/0325430 | A1 | 10/2014 | Vranjes et al. |

FOREIGN PATENT DOCUMENTS

| | | | |
|---|---|---|---|
| GB | 2486707 | A1 | 6/2012 |
| WO | 9845770 | A1 | 10/1998 |

OTHER PUBLICATIONS

International Searching Authority, U.S. Patent and Trademark Office, Written Opinion for PCT/US2013/059332, dated Sep. 12, 2013, 6 pages.

Cohen, et al., "Automatic Strategies in the Siemens RTL Tiled Window Manager", Retrieved at <<http://ieeexplore.ieee.org/stamp/stamp.jsp?tp=&arnumber=4808 >>, In Proceedings of 2nd IEEE Conference on Computer Workstations, Mar. 7, 1988, pp. 9.

Kandogan, et al., "Elastic Windows: Improved Spatial Layout and Rapid Multiple Window Operations", Retrieved at <<http://drum.lib.umd.edu/bitstream/1903/439/2/CS-TR-3522.pdf>>, In Proceedings of the Workshop on Advanced Visual Interfaces, May 27, 1996, pp. 10.

Muller, Hans., "MultiSplitPane: Splitting Without Nesting", Retrieved at <<http://today.java.net/pub/a/today/2006/03/23/multisplit-pane.html>>, Mar. 23, 2006, pp. 6.

Citron, David., What Determines the Monitor My App Runs on? Retrieved at <<http://stackoverflow.com/questions/52755/what-determines-the-monitor-my-app-runs-on/53187#53187>>, Sep. 9, 2008, pp. 3.

Smith, Tim, "WinSizeMe: Take Control of Window Sizes, Locations and More," retrieved at <<http://www.pcmag.com/article2/0,2817,2339650.asp>>, Jan. 27, 2009, 4 pages.

Manage Multiple Windows, retrieved at <<http://windows.microsoft.com/en-id/windows7/manage-multiple-windows>>, Retrieved Date: Apr. 10, 2010, pp. 5.

Kaelin, Mark., "Quick Tip: Display Two Metro UI Windows 8 Apps on the Same Screen", Retrieved at <<http://www.techrepublic.com/blog/window-on-windows/quick-tip-display-two-metro-ui-windows-8-apps-on-the-same-screen/6245>>, Retrieved Date: Jun. 11, 2012, pp. 4.

Stapleberg, Michael., "i3 User's Guide", Retrieved at <<http://i3wm.org/docs/userguide.html>>, Aug. 2012, pp. 29.

"Quickdroid", Retrieved at <<http://code.google.com/p/quickdroid/>>, Retrieved Date: Feb. 26, 2013, pp. 8.

"Recreating an Activity", Retrieved at <<http://developer.android.com/training/basics/activity-lifecycle/recreating.html>>, Retrieved Date: Feb. 26, 2013, pp. 3.

International Searching Authority, U.S. Patent and Trademark Office, International Search Report and Written Opinion for PCT/US2013/060491, dated Dec. 3, 2013, 9 pages.

International Searching Authority, U.S. Patent and Trademark Office, International Search Report and Written Opinion for PCT/US2013/060247, dated Dec. 10, 2013, 10 pages.

International Searching Authority, U.S. Patent and Trademark Office, International Search Report and Written Opinion for PCT/US2013/060762, dated Feb. 5, 2014, 32 pages.

Non-Final Office Action, U.S. Appl. No. 13/872,159, dated Feb. 11, 2015, 17 pages.

Non-Final Office Action, U.S. Appl. No. 13/863,369, dated Feb. 27, 2015, 17 pages.

Final Office Action, U.S. Appl. No. 13/872,159, dated Jul. 14, 2015, 18 pages.

Final Office Action, U.S. Appl. No. 13/863,369, dated Jul. 21, 2015, 18 pages.

International Preliminary Report on Patentability Issued in PCT Application No. PCT/US2013/060247, Mailed Date: Oct. 29, 2015, 8 Pages.

International Preliminary Report on Patentability Issued in PCT Application No. PCT/US2013/060491, Mailed Date: Oct. 29, 2015, 7 Pages.

International Preliminary Report on Patentability Issued in PCT Application No. PCT/US2013/059332, Mailed Date: Oct. 29, 2015, 8 Pages.

Non-Final Office Action, U.S. Appl. No. 13/872,159, dated Nov. 10, 2015, 20 pages.

International Preliminary Report on Patentability Issued in PCT Application No. PCT/US2013/060762, Mailed Date: Nov. 12, 2015, 7 Pages.

Non-Final Office Action, U.S. Appl. No. 13/862,481, dated Nov. 19, 2015, 13 pages.

Non-Final Office Action, U.S. Appl. No. 13/863,369, dated Dec. 21, 2015, 18 pages.

Non-Final Office Action, U.S. Appl. No. 13/862,478, dated Feb. 19, 2016, 31 pages.

Final Office Action, U.S. Appl. No. 13/862,481, dated Jul. 15, 2016, 14 pages.

Final Office Action, U.S. Appl. No. 13/863,369, dated Aug. 18, 2016, 20 pages.

\* cited by examiner

APPLICATION-TO-APPLICATION LAUNCH WINDOWING

BACKGROUND

A window management system can display a window for each program being used within a user interface. For example, in a single user interface, a user can view a first window for a word processing program, a second window for an email program, and a third window for a browser. Each window serves as a separate display within the user interface through which the user can interact with one of the programs.

However, convenient placement of a new window in a user interface can be a challenge when a new program is launched. Screen "real estate" can already be filled with one or more other windows, so it is nontrivial for the window management system to determine where to place the new window, particularly when the placement is performed without user guidance.

SUMMARY

Implementations described and claimed herein address the foregoing problems by providing a window management system that manages the placement (e.g., the sizing and/or locating) of a window of a target application within a user interface. A source application launches the target application. The window management system arbitrates placement of a window of a target application within the user interface based on a target application placement preference parameter and a source application placement preference parameter. The window management system displays the window of the target application within the user interface according to the arbitrated placement. The window management system can also display a window of the source application within the user interface according to the arbitrated placement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Launching an application window includes without limitation initially executing the application and switching to a new or hidden application window of an already executing application. In addition, an application window may include without limitation a window of the operating system components, an operating system utility, and a special purpose application program (e.g., a Web browser program, a word processing program, a spreadsheet program).

Figure 1:
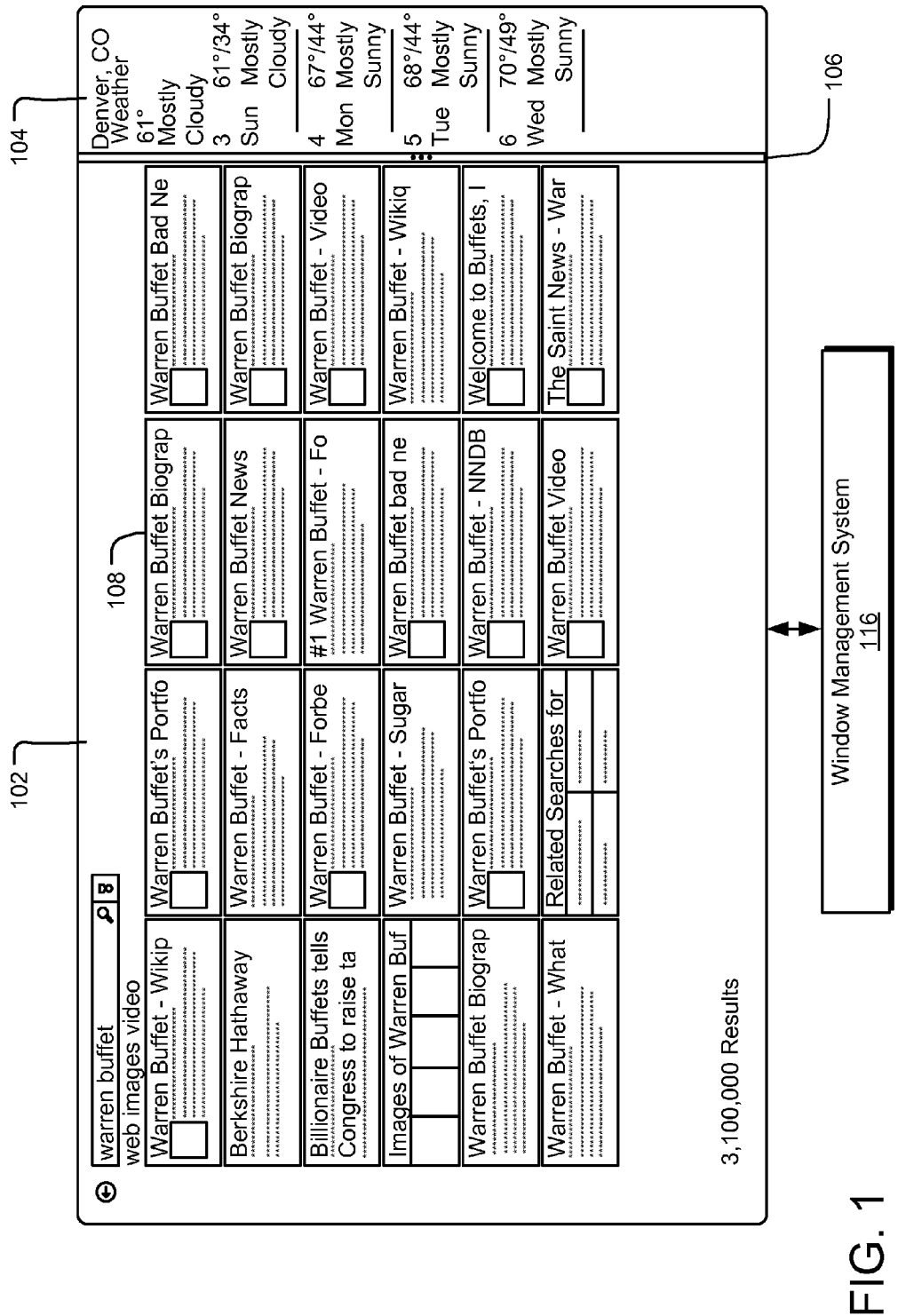
FIG. 1 illustrates two application windows in an example user interface screen managed by a window management system.

FIG. 1 illustrates two application windows 102 and 104 in an example user interface screen supported by window management system 116. A window management system 116 is typically a component of an operating system or user interface environment but could also be an independent application. The window management system 116 manages the display, placement, layout, appearance, and other aspects of the application windows 102 and 104, as well as other windows and user interface characteristics and operations.

The application window 102 presents a search result window displaying search results from a Web search engine. The individual search results (such as a search result 108) includes representative text and/or one or more images along with a browser navigable link, which can be selected by the user for navigation to a Web site identified by the browser navigable link. The application window 104 presents results from a weather application or Web site, including a 4-day forecast of weather in Denver, Colo. A window boundary control 106 divides the displayed area of the application window 102 and displayed area of the application window 104, in the illustrated case, separating the application windows. In some implementations, the window boundary control 106 may be manipulated by the user to change the size and/or location of one or both windows.

The application windows 102 and 104 are shown in FIG. 1 as being non-overlapping windows. However, the described technology is not limited to non-overlapping windowing environments. For example, in such environments, each application window in an overlapping windowing environment may be bounded by a window boundary control, which can be manipulated by the user to change the location, size, and front-to-back ordering (collectively, "placement") of the potentially overlapping windows. The window management system 116 receives input through the application windows 102 and 104 and through other user interface components (e.g., the keyboard interface, a touch screen interface, a voice interface, and pointing device) and displays the applications windows 102, the window boundary control 106, and other application windows and controls through the user interface.

In one implementation, an event triggers a launch of an application window via the window management system 116. For example, in one implementation, a user can select a browser-navigable link from the search result 108, which launches a browser window displaying the Web page designated by the link.

In another example, the user selects an application from a system file search window, a Start screen, or a Start menu to launch a corresponding application window. In such circumstances, brokered user interface (UI) elements, which are not specifically within a source application's window but are nevertheless associated with the source application while being presented elsewhere, may be triggered outside of the source application's window, resulting in a launch of a target application window by the source application. For example, a weather application may have a settings charm that can be invoked by the user as a flyout on a side of the display (outside of the weather application's window). The settings charm may include a link to "Help topics," which can be triggered by the user to launch a help application window or a browser application window, the placement of which is arbitrated by the window management system 116 as part of an application-to-application launch. Other examples of event-triggered launches are contemplated.

When an application window is launched, the window management system 116 attempts to determine a placement within the user interface with which to display the application window. For example, some application windows are characterized by predefined display parameters (e.g., full screen, a left portion of the screen, at least half the screen, etc.). Some predefined characteristics may provide no constraints or some constraints (e.g., a minimum size) but otherwise leave the window placement up to the window management system 116.

In circumstances in which the window management system 116 has options for placement of the launched application window, the window management system 116 can arbitrate between the preferences of a source program (i.e., the program that launches a target program) and the preferences of the target program (i.e., the program being launched by the source program). Other preference may be contributed by external factors (those factors not specific to the source or target programs), such as other launched bystander applications with visible windows, a user's preferences (e.g., a user always wants an instant messaging application window to open on the right side of the display), capabilities of the display device, etc. By arbitrating these preferences, the window of the target program and the window of the source program can be configured (e.g., placed) appropriately within the user interface.

The available area within a user interface (e.g., within a display screen) can quickly become filled with application windows. When a source program launches a target program, the window for the launched program can open to occlude previously opened windows. Sometimes this occlusion occurs even when there is available area within the user interface where the new window could have opened without causing the occlusion. Other scenarios exist where the opening of a new window is less than ideal (e.g., a large screen application window leaves little or no room to launch a new application window). In accordance with one implementation, the process of launching a new window for an invoked application can be arbitrated so that the user interface's area is utilized more beneficially.

Figure 2:
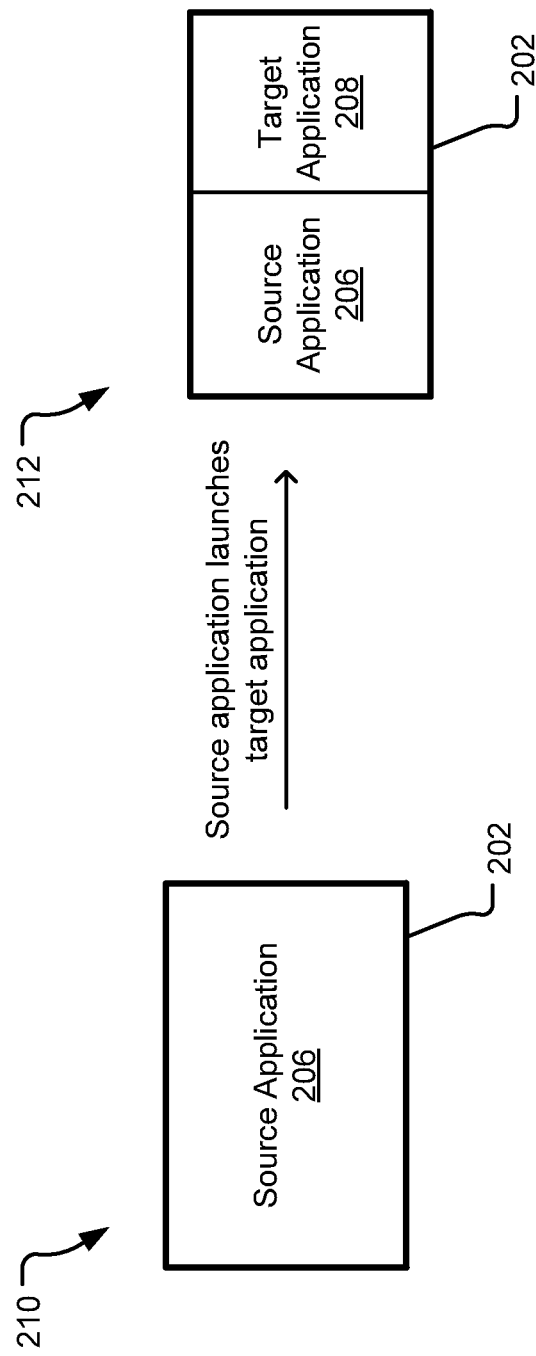
FIG. 2 illustrates an example of an arbitrated launch of a target application from a source application.

FIG. 2 illustrates an example of an arbitrated launch of a target application 208 from a source application 206. The target application 208 is a new application that is being invoked by the source application 206. The source application 206 is the program that is already running on a user's computing device. One example of a source application invoking a target application is when an email program invokes the launch of a photo viewing program when the user requests to view an image attachment to an email. In such an instance, the email program acts as the source application and the photo viewer program acts as the target application.

At 210, the window of the source application 206 is shown as displayed within a user interface 202 (e.g., within a display screen). The target application 208 has not yet been launched by the source application 206, and the window for the source application 206 is shown as initially occupying the entire user interface 202. Once the source application 206 invokes the launch of the target application 208, a window management system arbitrates between the placement preference parameters of a source application 206 and the placement preference parameters of a target application 208 to determine how the window for the target application 208 and the window for the source application 206 is to be displayed within the user interface 202. As a result of the arbitration, the window management system shrinks the window of the source application 206 and places the window of the target application 208 to the right of the window for the source application 206.

The window management system performs the arbitration process because, in some instances, the source application 206 and the target application 208 may be requesting the same user interface resources. For example, each program may want to use a large portion of the user interface 202 for its respective window. In other examples, the programs may not be competing for user interface space (e.g., both programs may only need a small amount of display space); nevertheless, intelligent placement of the target application, the source application, and/or bystander applications is contemplated in such circumstances. A resulting layout may include "empty" spaces in the window layout (e.g., display space where no specific application window is displayed). Such empty spaces may also be considered application windows in that the window management system manages the empty spaces concurrently with the windows of executing applications (e.g., displaying a background in the empty spaces). In one implementation, the window management system performs the arbitration by allowing the source application and the target application to indicate placement preference parameters. Placement preference parameters can include without limitation the following example parameters:

1) a predefined absolute size and/or placement of the window;
2) a preferred, minimum, and/or maximum size of the window;
3) a preferred position on the screen for the window;
4) a preferred ratio of the window relative to another window;
5) a preferred region of the window, e.g. upper right quadrant;
6) a preferred left-to-right or right-to-left window arrangement for source and target windows;
7) a preferred treatment of the source program (e.g., force window of the source application to be minimized);
8) a preferred replacement of the source window with the target window;
9) a preferred number of windows allowed to occupy the screen with the target window;
10) a preferred status for being (or not being) the window in focus or in the foreground;
11) a preference of the source window to let the target window's placement preference parameters take priority;
12) a preference to launch a window at a position on the screen where it was located previously; and
13) a preferred size of the window after the window is no longer in focus or in the foreground.

In addition to the placement preference parameters, the window management system can be configured with predetermined arbitration rules to arbitrate how windows are to be displayed in view of the placement preference parameters. Using such placement preference parameters and/or predetermined arbitration rules, the window management system can determine how the windows are to be sized, located, and or put in z-order when a new window is launched. In addition, if there is any conflict between the placement preference parameters for two or more windows, the window management system can arbitrate to resolve the conflict. Further, if a source application window, target application window, and/or bystander windows lack preferences, predetermined default preferences may be used in the arbitration of the placements of the windows.

For example, in some instances, the placement preference parameters for the window of the source application and the placement preference parameters for the target application will be in conflict (e.g., the placement preference parameters for the target application 208 may specify that its window is to be opened so as to cover three quarters of the user interface, while the placement preference parameters of the source application 206 specify that its window is to occupy one half of the user interface. When such a conflict occurs, the window management system arbitrates the conflict by referring to the predetermined arbitration rules, which indicate what actions to take in the presence of particular types of conflicts.

One example of a predetermined arbitration rule may specify that, in the event of a conflict, the target application placement preferences are to be followed over the source application placement preferences. Another example rule may specify that, if the source application preference is to have the source application window replaced by the target application window, then the source application placement preference are given priority. Still another example rule may specify that, if a target application placement preference is to let the source application decide, then the source application placement preferences are given priority.

In one implementation, a source application may provide its placement preference parameters to the window management system the source application launches the target application and the target application may provide its placement preference parameters to the window management system as the target application is being launched. The window management system evaluates the placement preference parameters of each application, identifies and arbitrates conflicts (if any), and presents the source application window and the target application window within the user interface in accordance with the non-conflicting placement preference parameters and/or the arbitrated placement preference parameter results.

In another implementation, a configuration datastore (e.g., a manifest) storing the various placement preference parameters for each installed application can be accessed by the window management system. In this way, the window management system can more readily manage the windowing environment before the target application is actually launched. In another implementation, the target application can provide supplemental placement preference parameters after appropriate placement preference parameters from the configuration datastore are processed. If there is a difference between the parameters stored in the configuration datastore and the supplemental parameters provided by the target application, then the window management system can switch to the supplemental parameters supplied by the target application or arbitrate between the configuration datastore parameters and the supplemental parameters.

In another implementation, a placement preference parameter may be a variable (e.g., a ratio based on other user interface elements, such as the size of other visible windows or the user interface area) or be determined based upon an algorithm (e.g., depending upon the state of the source application or the protocol that is being used to invoke the target application). For example, if a conferencing program is invoking a word processing application, the word processing application may be configured to use more of the screen if the conferencing program is in voice mode rather than video mode. If the conferencing program is in video mode, then the word processing program may launch with a smaller window to allow the user to continue to have a large video window for the source video conferencing application.

In one implementation, a user can override the placement preference parameters of a source and/or target application, and in some implementations, the overriding placement preference parameters may be recorded in association with the corresponding applications. For example, a user can explicitly remove a source application window from the display so that an empty window (an empty space in the layout) is left behind in the window layout. This example may be interpreted as a user direction to launch the target application in the empty space. Accordingly, the user can configure the placement preference parameters for an application or for a pair of applications. In one example, the user can communicate such intentions through a variety of user interface actions, including without limitation gestures on a touch screen, keyboard input, or pointer device actions.

In addition to the source application window and the target application window, there may be other windows displayed within the user interface. These windows are referred to as bystander windows. The placement preference parameters can include parameters specifying how such bystander windows are to be treated. For example, the placement preference parameters can specify how many windows are allowed to be visible at one time. Moreover, the placement preference parameters may specify which of the bystander windows to keep as visible and which ones to minimize. The application may have a preference for using some bystander applications more than other bystander applications and thus desire to keep the more favored or more commonly used bystander applications visible within the user interface.

In addition, as part of the user placement preference parameters, the user may be able to mark bystander windows in order of preference. Thus, if certain windows are specified by the user to be closed or hidden, such windows can be closed or hidden in an order previously indicated by the user.

In accordance with another implementation, system-default placement preference parameters may be employed by the window management system. For example, a window management system may simply close or evict (e.g., removing from the window layout), by default, the right-most (or left-most) bystander window as a target application window is launched.

It should be understood that arbitration need not be limited to placement in the presence of a conflict among application placement preferences. In many implementations, the application placement preferences provide the window management system with information for intelligently laying out the windows in response to an application-to-application launch. The target application may not be aware of the existing layout of windows or their preferences, so the arbitration operation allows the window management system to curate the layout with some level of cooperative information among the windows (e.g., by virtue of arbitration rules, placement preferences, etc.).

Figure 3:
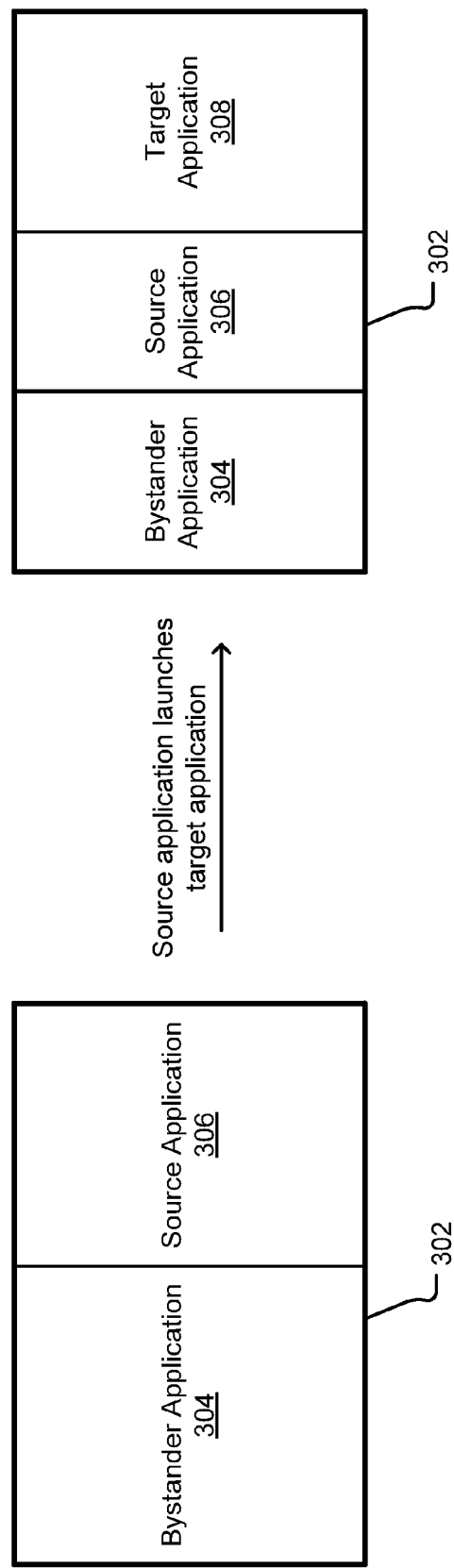
FIG. 3 illustrates an example of an arbitrated launch of a target application from a source application when a window of a bystander application visible.

FIG. 3 illustrates an example of an arbitrated launch of a target application 308 from a source application 306 when a window of a bystander application 304 is visible. In this example, the bystander application window 304 is initially displayed within the user interface 302. The source application window 306 is also displayed within the user interface 302. The source application 306 invokes the launch of the target application 308 through the window management system. In this example, the window of the bystander window 304 is retained within the user interface 302 but is made smaller. The window of the source application 306 is also made smaller and moved to a more centered position. The target application 308 is launched and its window is placed on the right hand side of the user interface 302. This implementation allows the windows of the bystander application window 304 and the source application 306 to remain visible after the target application 308 is launched.

Figure 4:
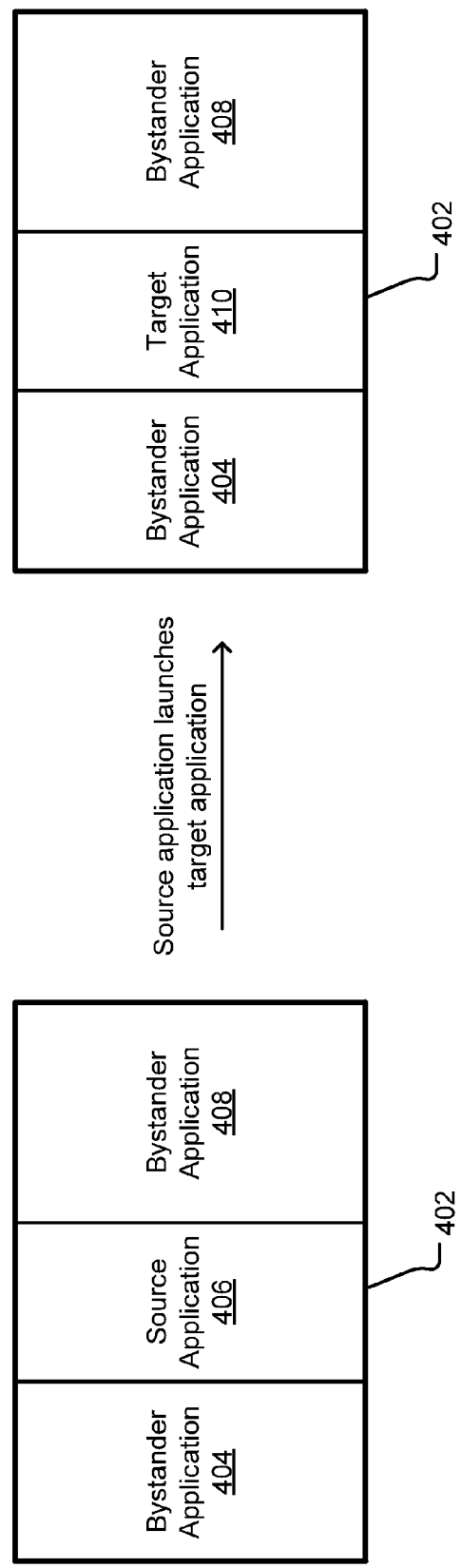
FIG. 4 illustrates an example of an arbitrated launch of a target application window from a source application such that the target application replaces the window of the source application.

FIG. 4 illustrates an example of an arbitrated launch of a target application 410 from a source application 406 such that the window of the target application 410 replaces the window of the source application 406. The user interface 402 is initially shown with a source application window and two bystander windows (for bystander applications 404 and 408). After the source application 406 launches the target application 410, the window management system replaces the source application window with the target application window within the user interface 402. The source application window can be minimized, occluded, or evicted in this example. Alternatively, the placement preference may specify that the window management system terminate the source application 406 and close its window.

Figure 5:
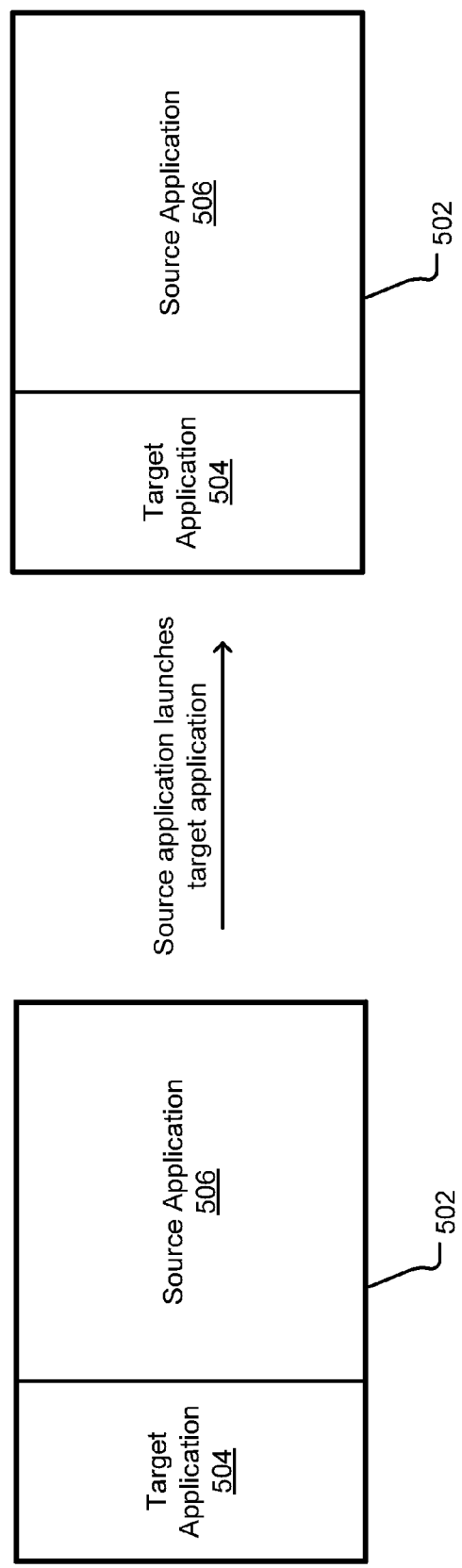
FIG. 5 illustrates an example in which a target application is already launched, and its window is visible within the user interface.

FIG. 5 illustrates an example in which a target application 504 is already launched, and its window and the window of a source application 506 are both visible within the user interface 502 (e.g., within a display screen). The source application 506 requires the use of the target application 504 (e.g., to display an image in a photo viewer). In one implementation, because the target application 504 is already launched and its window is visible, the window management system simply maintains its visibility. In an alternative implementation, the placement preference parameters of the target application 504 and the source application 506 are processed to change the relative sizes of the two windows (e.g., to make the window of the target application 504 larger than the window of the source application. In yet another implementation, focus is moved from the window of the source application 506 to the window of the target application 504. In an overlapping windowing environment, the window management system may bring the window of the target application 504 to the foreground and move the window of the source application 506 to the background (e.g., such that the target application window overlaps or occludes the source application window).

Figure 6:
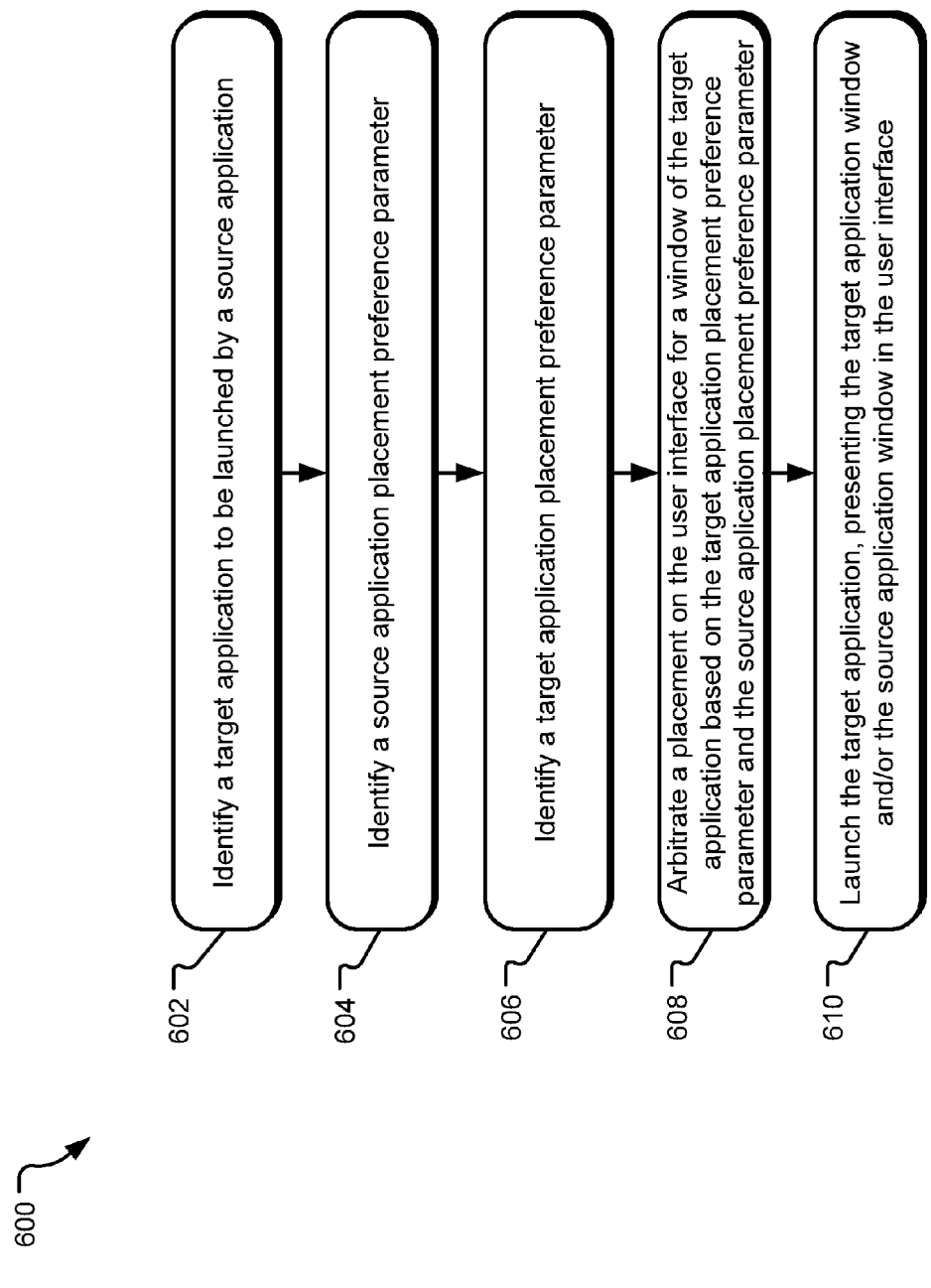
FIG. 6 illustrates an example sequence of operations for arbitrating placement of a target application and/or a source application window after launch of a target application by a source application.

FIG. 6 illustrates an example sequence of operations for arbitrating placement of a target application window and/or a source application window after launch of a target application by a source application. An identifying operation 602 identifies the target application to be launched by the source application. In one implementation, the target application can be launched through an application programming interface (API) call to the window management system or another component of the operation system. A sourcing operation 604 identifies placement preference parameter data for the source application window. A targeting operation 606 identifies target placement preference parameter for the target application window.

An arbitration operation 608 arbitrates any conflicts between the source placement preference parameters and the target placement preference parameter and determines the relative placement of the source application and target application windows. In some implementations, the arbitration operation 608 may also arbitrate placement of the source application windows and/or certain bystander applications windows.

A launch operation 610 launches the target application and presents (e.g., displays) the source application window and/or the target application window in the user interface.

As previously discussed, identification of the placement preference parameter data may be performed concurrently with the launch operation 610, which can occur before or after the arbitration operation 608. In some circumstances, the target application may already be executing and/or visible within the user interface, so the launch operation 610 displays its windows according to the placement determined in the arbitration operation 608.

Figure 7:
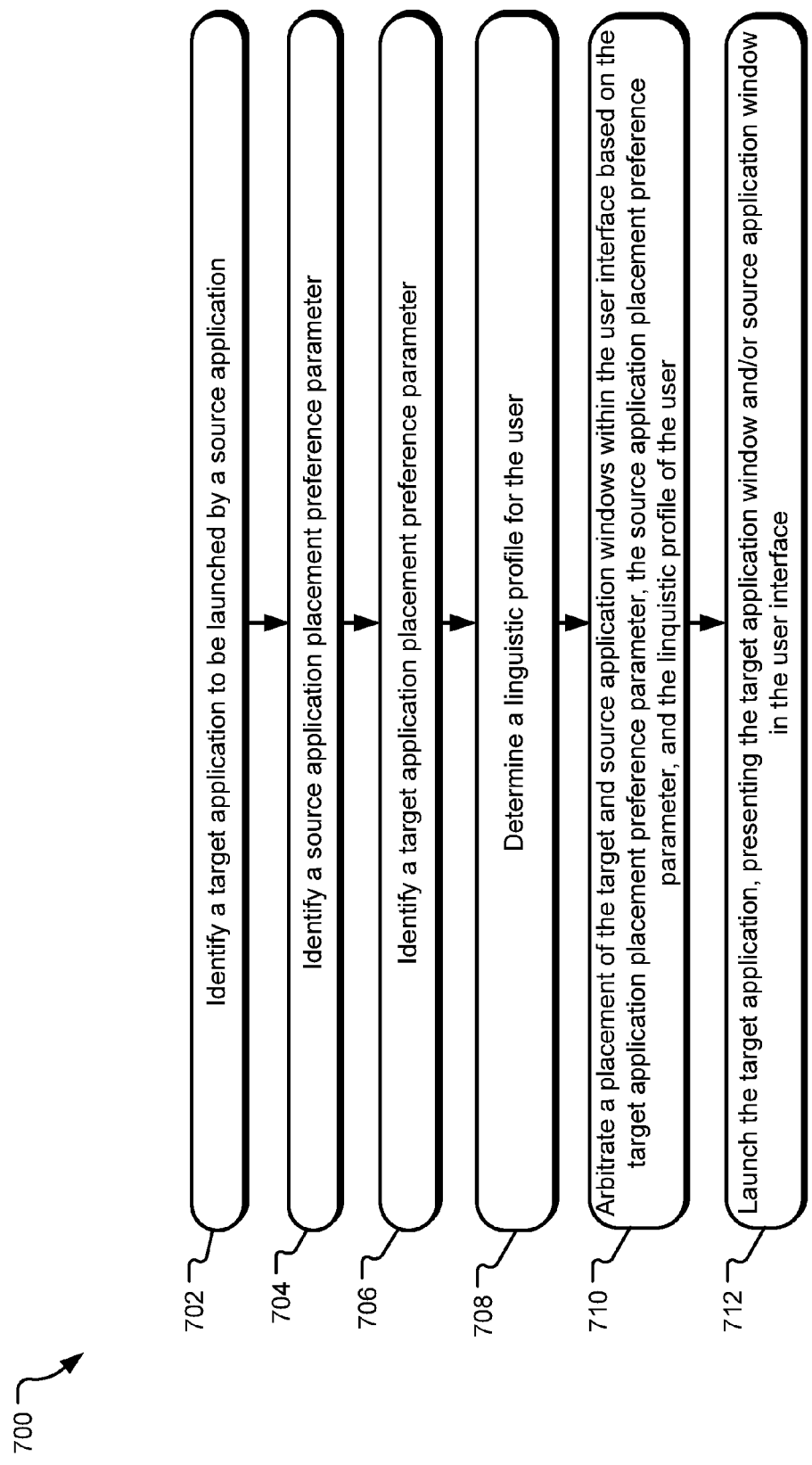
FIG. 7 illustrates an example sequence of operations for arbitrating placement of a target application window and/or a source application window after launch of a target application by a source application, based on a linguistic profile.

FIG. 7 illustrates an example sequence of operations for arbitrating placement of a target application window and/or a source application window after launch of a target application by a source application, based on a linguistic profile. An identifying operation 702 identifies the target application to be launched by the source application. In one implementation, the target application can be launched through an application programming interface (API) call to the window management system or another component of the operation system. It should be understood that launching may include activating a window that is already visible or otherwise present in the background of the display. A sourcing operation 704 identifies placement preference parameter data for the source application window. A targeting operation 706 identifies target placement preference parameter for the target application window. A profiling operation 708 determines a linguistic profile for the user to determine the natural reading direction of the user (e.g., right-to-left, left-to-right).

An arbitration operation 710 arbitrates any conflicts between the source placement preference parameters, the target placement preference parameters, and the linguistic profile and determines the relative placement of the source application and target application windows. For example, for a user having a natural reading direction from right-to-left, displaying the target application window to the left of the source application window may seem more natural than the opposite placement. Other preferences may be based on user preference data, display capabilities, etc. In some implementations, the arbitration operation 710 may also arbitrate placement of the source application windows and/or certain bystander applications windows.

A launch operation 712 launches the target application and presents (e.g., displays) the source application window and/or the target application window in the user interface in accordance with the arbitrated placement preferences and the linguistic profile. Thus, if the user is based in the United States, the windows can be arranged with the most recently launched windows on the right-hand side of the screen and the older windows to the left-hand side. Such a preference conforms to English readers being accustomed to read from left to right. Alternatively, the preference might be to arrange the windows from right to left for devices intended to be used in different language systems. Other user preference data may also be utilized to determine a preferred placement of the target application window and source application window. In such an instance, the user preference can override the normal arbitration rules.

Figure 8:
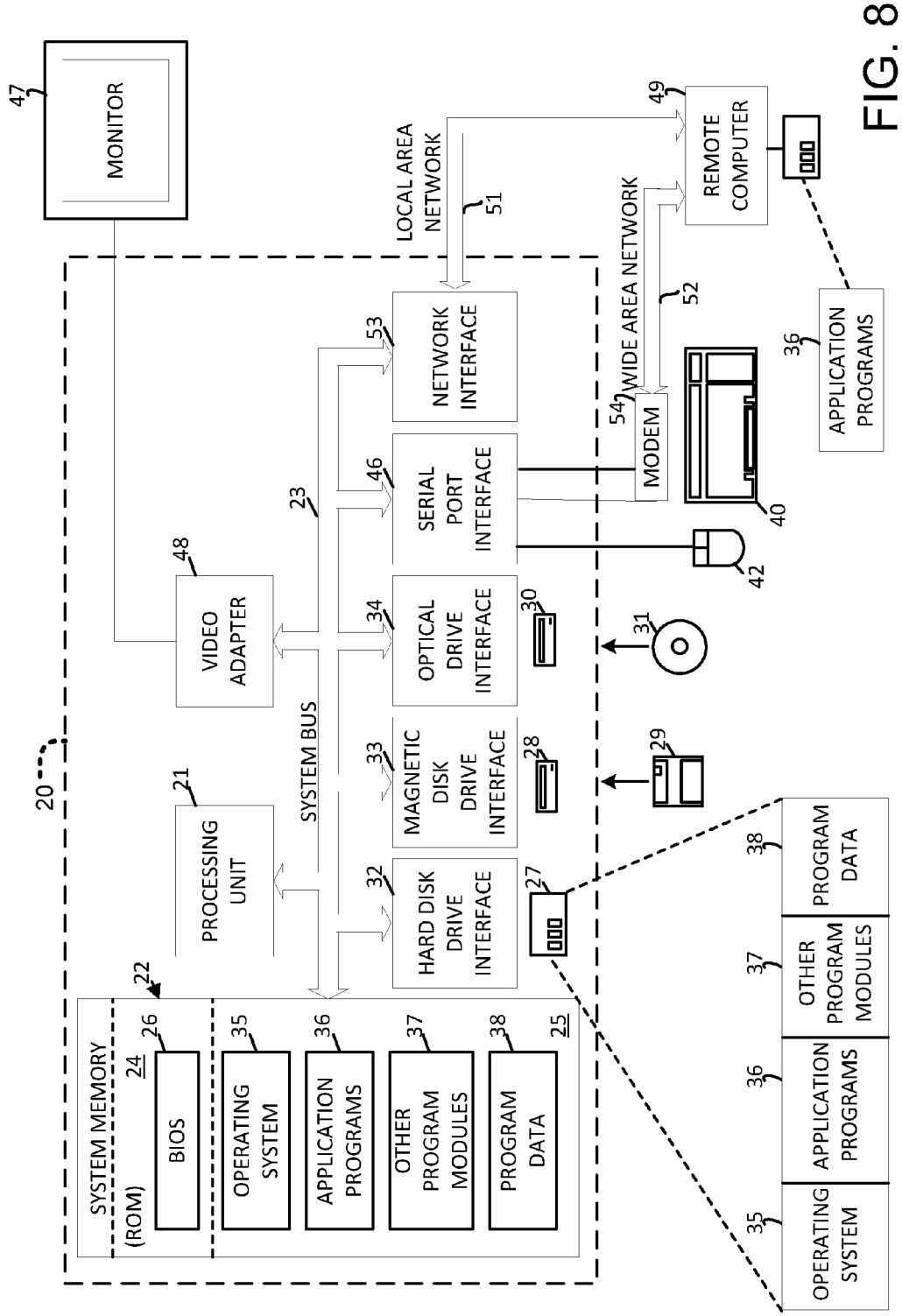
FIG. 8 illustrates an example system that may be useful in implementing the described technology.

FIG. 8 illustrates an example system that may be useful in implementing the described technology. The example hardware and operating environment of FIG. 8 for implementing the described technology includes a computing device, such as general purpose computing device in the form of a gaming console or computer 20, a mobile telephone, a personal data assistant (PDA), a set top box, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a window management system, window placement preference parameters, and other data may be stored in memory 22 and/or storage devices 29 or 31 and processed by the processing unit 21. The window placement preference parameters and other data may be stored in memory 22 and/or storage devices 29 or 31 as persistent datastores.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
    launching a target application from a source application, the target application having an associated target application placement preference parameter and the source application having an associated source application placement preference parameter;
    responsive to the launching of the target application, detecting a conflict between at least the target application placement preference parameter and the source application placement preference parameter;
    responsive to the launching of the target application, arbitrating placement of a window of the target application within a user interface by resolving the conflict between at least the target application placement preference parameter and the source application placement preference parameter, the target application being launched by the source application; and
    responsive to the launching of the target application, presenting the window of the target application within the user interface according to the arbitrated placement.

2. The method of claim 1 further comprising:
    arbitrating placement of a window of the source application within the user interface based on the target application placement preference parameter and the source application placement preference parameter; and
    presenting the window of the source application within the user interface according to the arbitrated placement of the window of the source application within the user interface.

3. The method of claim 1 further comprising:
    identifying the source application placement preference parameter.

4. The method of claim 3 wherein identifying the source placement preference parameter comprises:
    receiving the source application placement preference parameter from the source application.

5. The method of claim 1 further comprising:
    identifying the target application placement preference parameter.

6. The method of claim 5 wherein identifying target application placement preference parameter data comprises:
    receiving the target application placement preference parameter from a configuration file for the target application.

7. The method of claim 5 wherein identifying target application placement preference parameter data comprises:
    receiving the target application placement preference parameter from the target application.

8. The method of claim 1 further comprising:
    determining a linguistic profile for the user, the arbitrating operation comprising utilizing a linguistic profile to determine a relative placement between the window of the target application and a window of the source application.

9. The method of claim 1 wherein arbitrating placement comprises:
    utilizing user preference data to determine a placement arrangement for the window of the target application and a window of the source application.

10. The method of claim 1 wherein the at least one source from the target application placement preference parameter or the at least one target from the target application placement preference parameter specifies a ratio between a size of a window for the source application and a size of the window for the target application.

11. The method of claim 1 wherein the at least one target from the target application placement preference parameter specifies a full screen window for the target application.

12. The method of claim 1 wherein the at least one source from the target application placement preference parameter specifies that the at least one target from the target application placement preference parameter has priority and the operation of arbitrating placement comprises:
    deferring to the target application placement preference parameter in the case of a conflict between the source application placement preference parameter and the target application placement preference parameter.

13. One or more computer-readable storage media encoding computer-executable instructions for executing on a computer system a computer process wherein the one or more computer-readable media are not carrier waves, the computer process comprising:
    launching a target application from a source application, the target application having an associated target application placement preference parameter and the source application having an associated source application placement preference parameter;
    responsive to the launching of the target application, detecting a conflict between at least the target application placement preference parameter and the source application placement preference parameter;
    responsive to the launching of the target application, arbitrating placement of a window of the target application within a user interface by resolving the conflict between at least the target application placement preference parameter and the source application placement preference parameter, the target application being launched by the source application; and responsive to the launching of the target application, presenting the window of the target application within the user interface according to the arbitrated placement.

14. The one or more computer-readable media of claim 13 wherein the computer process further comprises:
arbitrating placement of a window of the source application within the user interface based on the target application placement preference parameter and the source application placement preference parameter; and
presenting the window of the source application within the user interface according to the arbitrated placement of the window of the source application within the user interface.

15. The one or more computer-readable media of claim 13 wherein the computer process further comprises:
determining a linguistic profile for the user, the arbitrating operation comprising utilizing a linguistic profile to determine a relative placement between the window of the target application and a window of the source application.

16. The one or more computer-readable media of claim 13 wherein the operation of arbitrating placement comprises:
utilizing user preference data to determine a placement arrangement for the window of the target application and a window of the source application.

17. The one or more computer-readable media of claim 13 wherein the at least one source from the target application placement preference parameter or the at least one target from the target application placement preference parameter specifies a ratio between a size of a window for the source application and a size of the window for the target application.

18. The one or more computer-readable media of claim 13 wherein the at least one source from the target application placement preference parameter specifies that the at least one target from the target application placement preference parameter has priority and the operation of arbitrating placement comprises:
deferring to the target application placement preference parameter in the case of a conflict between the source application placement preference parameter and the target application placement preference parameter.

19. A system comprising:
a processor;
a user interface; and
a window management system configured to assist in launching a target application from a source application and to arbitrate, via the processor, placement of a window of the target application within the user interface based on detecting and resolving a conflict between at least a target application placement preference parameter and a source application placement preference parameter in response to the launching of the target application, the target application being launched by the source application, and the processor sending a signal to a video adapter to present the window of the target application within the user interface according to the arbitrated placement.

20. The system of claim 19 wherein the window management system is further configured to arbitrate placement of a window of the source application within the user interface based on the target application placement preference parameter and the source application placement preference parameter and to present the window of the source application within the user interface according to the arbitrated placement of the window of the source application within the user interface.

* * * * *